: 3,146,237
DIMERCAPTOPYRIDINES AND A PROCESS
FOR THEIR PREPARATION
Martin A. Robinson, Orange, Conn., assignor to Olin
 Mathieson Chemical Corporation, New Haven, Conn.,
 a corporation of Virginia
No Drawing. Filed July 15, 1963, Ser. No. 295,194
5 Claims. (Cl. 260—294.8)

This invention relates to dimercaptopyridines and to a process for their preparation.

The preparation of monomercaptopyridines is old in the art, and these preparations have been frequently disclosed in the chemical literature. For example, it has been reported by Marckwald, Klemm and Travert, Ber., 33, 1556 (1900), and by Van Gastel and Wibaut, Rec. trav. chem. 53, 1031 (1934), that 2-chloropyridine and 2-iodopyridine were heated for several hours with potassium hydrosulfide in sealed tubes at 140° C. and 200° C. respectively to obtain 2-mercaptopyridine. However, the literature appears to be devoid of any disclosure relating to the preparation of dimercaptopyridines.

Therefore, an object of this invention was to provide a simple and efficient process for the preparation of dimercaptopyridines. Another object of this invention was to prepare the heretofore unknown compound, 2,6-dimercaptopyridine. Other objects will be apparent from the following discussion.

These objects have been accomplished in accordance with the present invention. A new composition, 2,6-dimercaptopyridine has been prepared. This material is useful as an intermediate in the preparation of linear disulfide polymers and has particular utility as a sequestering agent for heavy metals. A process is provided herein whereby dimercaptopyridines can be readily prepared at atmospheric pressure from the corresponding dihalogenopyridines.

In general, the process of this invention comprises the reaction of a dihalogenopyridine with an alkali metal hydrosulfide in an inert organic solvent at temperatures in excess of about 160° C. The alkali metal halide formed as a result of the reaction can be easily removed by filtration thereby leaving the desired dimercaptopyridine in solution.

A number of inert organic solvents may be utilized as the required solvent in the preparation of the dimercaptopyridines. Glycerine is a useful solvent. Glycols are particularly effective, and thus ethylene glycol, diethylene glycol, triethylene glycol, propylene glycols (both 1,2 and 1,3-isomers), dipropylene glycols and polyethylene glycols having a molecular weight of up to about 400 are suitable solvents in the practice of this invention. Neopentyl glycol (2,2-dimethyl-1,3-propanediol) is also a suitable solvent. Glycol ethers including the cellosolves and carbitols may be utilized if the boiling points of such compounds is above 160° C. However, the preferred solvents for use in the process are glycols having a boiling point of 160°–200° C.

Although a minimum reaction temperature of 160° C. must be employed, the preparations can with suitable solvents be carried out at temperatures in excess of 200° C. if desired. However, a reaction temperature range of between about 160° C. and 200° C. is preferably utilized in the synthesis of the dimercaptopyridines.

A number of dihalogenopyridines can be used as reactants in the process disclosed herein wherein the corresponding dimercaptopyridines are obtained. For example, such dihalogenopyridines include: 2,6-dichloropyridine, 2,6-dibromopyridine, 2,6-difluoropyridine, 2,3-dichloropyridine, 2,5-dichloropyridine, and 3,5-dichloropyridine. The following example will serve to illustrate the preparation of a dimercaptopyridine in accordance with the process of this invention wherein 2,6-dichloropyridine is a starting reactant.

*Example 1*

Freshly prepared potassium hydrosulfide was obtained in the following manner. 200 grams of potassium hydroxide and 50 mls. of water were placed in a 300 ml. flask. Hydrogen sulfide gas was bubbled into the flask until the solution color changed from brown to green. The complete conversion of the hydroxide to the hydrosulfide was also ascertained by checking the increased weight of the solution. The water was then removed by evaporation on a rotary evaporator leaving the white potassium hydrosulfide solid.

Two hundred milliliters of 1,2-propylene glycol was added to the potassium hydrosulfide. The mixture was agitated for a short period and then poured into a two liter three-necked flask. The remaining solid was removed by washing with six-fifty milliliter portions of propylene glycol, and transferring the washes to the three-necked flask. The flask was equipped with a stirrer, condenser and a heated dropping funnel.

The mixture in the flask was heated to reflux. A solution of 100 g. (0.66 mole) of 2,6-dichloropyridine in 250 ml. of hot propylene glycol was placed in the dropping funnel and added dropwise with stirring to the reaction flask. The dropping funnel was steam heated to maintain the 2,6-dichloropyridine in solution. The reaction mixture was refluxed for 24 hours upon completion of the addition. After cooling the reaction mixture to room temperature, solid potassium chloride was filtered from the mixture. Then the propylene glycol was completely removed from the filtrate by distillation at 54° C./0.5 mm.

The solid product remaining was dissolved in 50 mls. of hot water, and the pH of this solution was adjusted to 0.5 by the slow addition of a 30% HCl solution. A yellow precipitate formed and was isolated by filtration. This solid was recrystallized from acetone to yield a crystalline product melting at 148°–52° C. The following analytical data revealed that the desired 2,6-dimercaptopyridine had been obtained.

*Analysis.*—Calcd. for $C_5H_5NS_2$: C, 41.96; H, 3.50; N, 9.80; S, 44.76. Found: C, 41.75; H, 3.98; N, 9.38; S, 44.46.

It has been found that 2,6-dimercaptopyridine is a very effective sequestering agent, and this compound forms complexes with numerous heavy metals. For example, 2,6-dimercaptopyridine forms complexes with divalent iron, cobalt, nickel, copper, zinc, mercury and cadmium. The complexes contain either a 2:1 or 3:1 ratio of the 2,6-dimercaptopyridine component to the metal involved. Therefore, this derivative is a useful compound since it may be used to remove numerous heavy metals from environments where their presence is harmful. Thus, it is well known that copper is an undesirable contaminant in rubber formulations since it interferes with vulcanization procedures utilizing sulfur. The 2,6-dimercaptopyridine may be used to advantageously and quickly remove such copper impurities from rubber formulations prior to vulcanization.

The following procedure will serve to illustrate the use of 2,6-dimercaptopyridine as a sequestering agent. A solution of 2.0 g. (.016 mole) of ferrous chloride in methanol was prepared. This solution was added to a warm methanol solution of 0.03 mole of 2,6-dimercaptopyridine with stirring. A precipitate formed immediately, and it was filtered, washed with methanol and ether, and dried over $P_2O_5$ in vacuo at 100° C. The dried solid was brown solid material. The following analytical data revealed that a complex of the 2,6-dimercaptopyridine and iron had been formed which contained a 3:1 ratio of the dimercapto-derivative.

*Analysis.*—Theory for above complex: C, 35.85; H, 2.99; N, 8.37. Found: C, 35.37; H, 2.94; N, 7.94.

What is claimed is:

1. 2,6-dimercaptopyridine.

2. A process for preparing a dimercaptopyridine which comprises reacting an alkali metal hydrosulfide with a dihalogenopyridine in an inert organic solvent at a temperature of at least 160° C.

3. The process of claim 2 wherein the said organic solvent is selected from the class consisting of glycerine, glycols, and glycol ethers, each member of said class having a boiling point of at least 160° C.

4. A process for preparing a dimercaptopyridine which comprises dissolving an alkali metal hydrosulfide in a glycol solvent having a boiling point of 160°–200° C., reacting a dihalogenopyridine with said hydrosulfide at a temperature of at least 160° C., removing the formed alkali metal halide from the reaction mixture, and isolating the dimercaptopyridine.

5. The process of claim 4 wherein a 2,6-dihalogenopyridine is converted to 2,6-dimercaptopyridine.

No references cited.